(12) United States Patent
Sanqunetti

(10) Patent No.: US 7,680,590 B2
(45) Date of Patent: Mar. 16, 2010

(54) BOUNDARY DETECTION ALGORITHM FOR EMBEDDED DEVICES

(75) Inventor: Douglas R. Sanqunetti, Cicero, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1535 days.

(21) Appl. No.: 10/726,278

(22) Filed: Dec. 2, 2003

(65) Prior Publication Data
US 2004/0138808 A1 Jul. 15, 2004

Related U.S. Application Data

(63) Continuation-in-part of application No. 10/301,994, filed on Nov. 22, 2002, now Pat. No. 6,721,652.

(51) Int. Cl.
*G01C 21/00* (2006.01)
(52) U.S. Cl. ............... 701/207; 701/1; 701/200; 701/208; 340/995.1; 340/995.17; 340/995.19; 340/995.24; 340/995.27
(58) Field of Classification Search ........... 701/207, 701/200, 300
See application file for complete search history.

(56) References Cited

U.S. PATENT DOCUMENTS

| | | | | |
|---|---|---|---|---|
| 4,823,282 A | * | 4/1989 | Yamagami | 345/620 |
| 4,947,344 A | * | 8/1990 | Hayashi et al. | 345/658 |
| 5,270,937 A | * | 12/1993 | Link et al. | 701/209 |
| 5,541,845 A | | 7/1996 | Klein | 364/449 |
| 5,724,040 A | * | 3/1998 | Watnick | 342/26 D |
| 5,796,634 A | * | 8/1998 | Craport et al. | 702/150 |
| 5,801,970 A | * | 9/1998 | Rowland et al. | 703/6 |
| 5,848,373 A | * | 12/1998 | DeLorme et al. | 701/200 |
| 5,872,870 A | * | 2/1999 | Michael | 382/291 |
| 5,946,426 A | * | 8/1999 | Carlebach | 382/299 |
| 5,956,701 A | * | 9/1999 | Habermehl | 706/20 |

(Continued)

FOREIGN PATENT DOCUMENTS

CA 2505426 6/2004

(Continued)

OTHER PUBLICATIONS

Canadian Office Action, Application No. 2,546,284, Oct. 29, 2007, pp. 1-3.

(Continued)

*Primary Examiner*—Khoi Tran
*Assistant Examiner*—Jonathan Sample

(57) ABSTRACT

Techniques for detecting boundary crossings may involve the use of rectangles that approximate a boundary. Data defining the rectangles may be retrieved, and a current location of a monitored device may be identified. The current location may be compared with the rectangles, and a determination that the current location is located within a rectangle may indicate a boundary crossing. To simplify the calculations on the monitored device, certain calculations may be performed in advance. For example, an angle between a selected side of a particular rectangle and an axis of the coordinate system may be determined, and the particular rectangle may be rotated by the angle to orient the rotated rectangle parallel to the axis of the coordinate system. Subsequently, location coordinates for a monitored device may be rotated and compared with a corresponding rotated rectangle to determine whether the monitored device is located within the particular rectangle.

33 Claims, 10 Drawing Sheets

U.S. PATENT DOCUMENTS

| | | | |
|---|---|---|---|
| 5,974,419 A * | 10/1999 | Ashby | 707/100 |
| 6,185,343 B1 * | 2/2001 | Ikeda et al. | 382/291 |
| 6,522,875 B1 * | 2/2003 | Dowling et al. | 455/414.3 |
| 6,535,743 B1 * | 3/2003 | Kennedy et al. | 455/456.1 |
| 6,560,532 B2 * | 5/2003 | Cayford | 701/209 |
| 6,581,005 B2 | 6/2003 | Watanabe et al. | 701/210 |
| 6,721,652 B1 | 4/2004 | Sanqunetti | |
| 6,728,392 B1 | 4/2004 | Joshi | 382/104 |
| 6,983,202 B2 | 1/2006 | Sanqunetti | |
| 7,116,977 B1 * | 10/2006 | Moton et al. | 455/419 |
| 2002/0072963 A1 | 6/2002 | Jonge | 705/13 |
| 2003/0048218 A1 * | 3/2003 | Milnes et al. | 342/357.07 |
| 2003/0163249 A1 * | 8/2003 | Kapolka et al. | 701/123 |
| 2004/0102898 A1 * | 5/2004 | Yokota et al. | 701/210 |

FOREIGN PATENT DOCUMENTS

JP 08014924 1/1996

OTHER PUBLICATIONS

PCT International Search Report, PCT/US2004/036291, Mar. 1, 2005, pp. 1-4.

International Preliminary Report on Patentability and Written Opinion, PCT/US2004/036291, Jun. 15, 2006, 7 pages.

Canadian Office Action, Application No. 2,546,284, dated Oct. 2, 2008 (3 pages).

* cited by examiner

BOUNDARY DETECTION ALGORITHM FOR EMBEDDED DEVICES

CROSS-REFERENCE TO RELATED APPLICATIONS

This application is a continuation-in-part, of U.S. patent application Ser. No. 10/301,994, filed on Nov. 22, 2002, now U.S. Pat. No. 6,721,652, and entitled "Implementing Geofencing on Mobile Devices," which is incorporated by reference herein.

TECHNICAL FIELD

This description relates to detecting the location of a mobile device, and more particularly to detecting movement of a mobile device across a predetermined boundary.

BACKGROUND

Actions that occur within an area may be subject to certain restrictions, and when a person, vehicle or object leaves the area, the restrictions may be changed or lifted. For this reason, there are situations in which it is necessary to detect when one area is exited and another area is entered. For example, the International Fuel Tax Agreement (IFTA) requires that taxes be paid to each state on fuel that is used in that state. The IFTA is an agreement among 48 states in the United States and 10 provinces in Canada to simplify the reporting of fuel use taxes by interstate motor carriers. IFTA reporting significantly reduces the paperwork and standardizes the reporting of fuel use taxes. To participate in the IFTA, a driver of a vehicle manually records odometer and fuel gauge readings of the vehicle after each boundary crossing. At the end of a trip, the driver reports the mileage and fuel readings taken during the trip. The mileage and fuel readings enable the manual calculation of the distance traveled and the fuel used in each of the states visited by the driver, from which the fuel taxes owed to those states are calculated.

SUMMARY

Techniques may be implemented for automatically detecting boundary crossings. Among other things, the automatic detection of movement across a boundary simplifies the process of reporting fuel use taxes. An automatic boundary detection and vehicle data collection routine may be used to report the distance traveled and the amount of fuel used in each of the states and provinces participating in the IFTA. The tax owed to the visited states may be calculated automatically from the reports of distance traveled and fuel used. The techniques are not limited to use in calculating fuel taxes or to detecting crossing state lines, but may be used to detect any type of boundary crossings.

In one general aspect, data defining rectangles associated with a boundary may be retrieved, and a current location of a monitored device may be identified. The current location may be compared with the rectangles using the data defining the rectangles, and a determination that the current location is within a rectangle may indicate a boundary crossing.

Implementations may include one or more of the following features. For example, a boundary may be defined within a coordinate system using one or more rectangles, and an angle may be determined between a selected side of a specific rectangle of the boundary and an axis of the coordinate system. The specific rectangle may be rotated by the angle such that the selected side of the rotated rectangle is oriented parallel to the axis of the coordinate system. A set of coordinates associated with a particular location of a monitored device may be identified and rotated by the angle. The rotated set of coordinates may be compared to the rotated rectangle to determine whether the location of the monitored device is within the specific rectangle.

A boundary crossing may be detected if the location of the monitored device is located within the specific rectangle. A pre-selected response may be initiated if a boundary crossing is detected. The pre-selected response may include determining a new jurisdiction entered as a result of the boundary crossing, loading a boundary for the new jurisdiction, and detecting a crossing of the new jurisdiction boundary. The pre-selected response may include gathering information related to the boundary crossing. The monitored device may be a vehicle, and the gathered information may include a distance traveled and/or an amount of fuel used by the vehicle. The gathered information may be sent over a wireless interface to a central server and also may be stored on the device being monitored.

The boundary may be defined by a collection of overlapping rectangles, and a different rectangle of the collection of overlapping rectangles may be selected if the location of the monitored device is not located within a current rectangle. The different rectangle may be rotated by an angle between a selected side of the different rectangle and an axis of the coordinate system such that the selected side of the rotated different rectangle is oriented parallel to the axis of the coordinate system. The identified set of coordinates may be rotated by the angle between the selected side of the different rectangle and the axis of the coordinate system to generate a second set of rotated coordinates. The second set of rotated coordinates may be compared to the rotated different rectangle to determine whether the location of the monitored device is within the different rectangle. The rectangle may be defined by coordinates of two opposite corners of the rectangle. Rotating the boundary may involve rotating the coordinates of the two opposite corners of the rectangle by the angle, and comparing the rotated set of coordinates to the rotated rectangle may involve comparing the rotated set of coordinates to the rotated coordinates of the two opposite corners of the rectangle.

The boundary may represent a boundary between a first jurisdiction and a second adjacent jurisdiction. The boundary may be stored as a file by the monitored device. The file may be formatted in, for example, an XML format or a binary format. The rectangle may include an associated indicator of a jurisdiction that is occupied if the location of the monitored device is within the specific rectangle. A boundary for the jurisdiction that is occupied if the location of the monitored device lies within the specific rectangle may be loaded. Defining the boundary, determining the angle, and rotating the specific rectangle may be performed by a central server. Identifying the set of coordinates associated with a particular location, rotating the set of identified coordinates, and comparing the rotated set of coordinates to the rotated rectangle may be performed by the monitored device, as may be retrieving data defining rectangles associated with the boundary, identifying the current location of the monitored device, and comparing the current location to the rectangles.

A distance covered and/or an amount of fuel used within a jurisdiction defined by the boundary may be determined. Statistics related to the jurisdiction defined by the boundary may be determined. Adjacent jurisdiction boundary data may be retrieved when a boundary crossing is indicated; the adjacent jurisdiction boundary data may define rectangles associated with a boundary of an adjacent jurisdiction that is occupied after a boundary crossing. The rectangles may correspond to the boundary of a current jurisdiction, and the rectangles defining the boundaries of adjacent jurisdictions may not overlap the rectangles corresponding to the boundary of the current jurisdiction.

The data defining rectangles may include, for each rectangle, an angle of rotation for the rectangle and rotated coordinates of two opposite corners of the rectangle, and the rotated coordinates may correspond to coordinates of the rectangle that have been rotated by the angle of rotation. Comparing the current location with the rectangles may involve selecting a rectangle from the data defining rectangles, rotating a set of coordinates defining the current location by an angle of rotation associated with the selected rectangle, and comparing the rotated coordinates defining the current location to rotated coordinates of two opposite corners of the selected rectangle.

In another general aspect, a locator may be used to identify a location of a monitored device, and a memory may operate to store angles of rotation and rotated coordinates associated with a predetermined boundary. The rotated coordinates may correspond to original coordinates defining the predetermined boundary in a coordinate system. Each of the original coordinates may be rotated by a corresponding angle of rotation to generate the corresponding rotated coordinates prior to storing each of the rotated coordinates in the memory. The rotated coordinates may define at least one rectangle of a rotated boundary. A processor may operate to rotate coordinates representing the identified location by one or more of the stored angles of rotation to calculate rotated location coordinates and to compare the rotated location coordinates with corresponding rotated coordinates to determine a relative position between the monitored device and the predetermined boundary.

Implementations may include one or more of the following features. For example, the monitored device may include the locator, the memory, and the processor. A mobile transmitter may operate to selectively send a message based on the position of the monitored device relative to the predetermined boundary. The memory may store data corresponding to segments of the rotated boundary, and each segment may be identified by two or more sets of rotated coordinates and may have an associated angle of rotation. The boundary represents a boundary around a geographic area and each segment of the boundary may be a rectangle. A second processor may operate to calculate the angles of rotation and to rotate the original coordinates defining the predetermined boundary by the corresponding angle of rotation to generate the rotated coordinates prior to storing the angles of rotation and the rotated coordinates in the memory. Each segment may have one or more edges that are oriented parallel to an axis of the coordinate system, and each angle of rotation may be defined by an angle between an axis of the coordinate system and a side of the segment associated with the original coordinates to be rotated. The locator may be a global positioning satellite receiver.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A boundary detection routine can be used to automatically initiate a predetermined response when a mobile device crosses a predefined virtual boundary. One implementation is in the realm of reporting fuel use statistics when boundaries between states are crossed. However, it should be understood that the routine may be used in other types of applications where it is desirable to monitor whether a mobile device has crossed one or more virtual boundaries.

In the case of reporting fuel use statistics, a driver of a vehicle does not have to report his odometer and fuel gauge readings manually whenever a boundary between two states or provinces is crossed. Each time the boundary is crossed, the mobile device that monitors the vehicle's position may retrieve the odometer and fuel gauge readings and send them to a central system that compiles the information and calculates the fuel tax owed to the states that the driver visited. In addition, the boundary around the state that the vehicle enters as a result of the boundary crossing may be loaded, and the mobile device may operate to detect movement of the vehicle across the boundary of the new state.

When implementing the boundary detection algorithm on mobile devices, particularly on embedded devices that have limited processing power, reducing the number of calculations required to perform useful work helps to avoid overburdening the local processor of the mobile device. Determining whether a mobile device has crossed a predefined boundary can involve a relatively CPU-intensive calculation.

The described techniques provide an efficient way of defining a boundary and determining whether coordinates associated with a particular location indicate that the boundary has been crossed. In particular, the techniques allow the majority of the calculations necessary for implementing the boundary detection routine to be performed on a desktop computer or other high-powered processing device and require very little processing or communications by the monitored mobile device.

Figure 1:
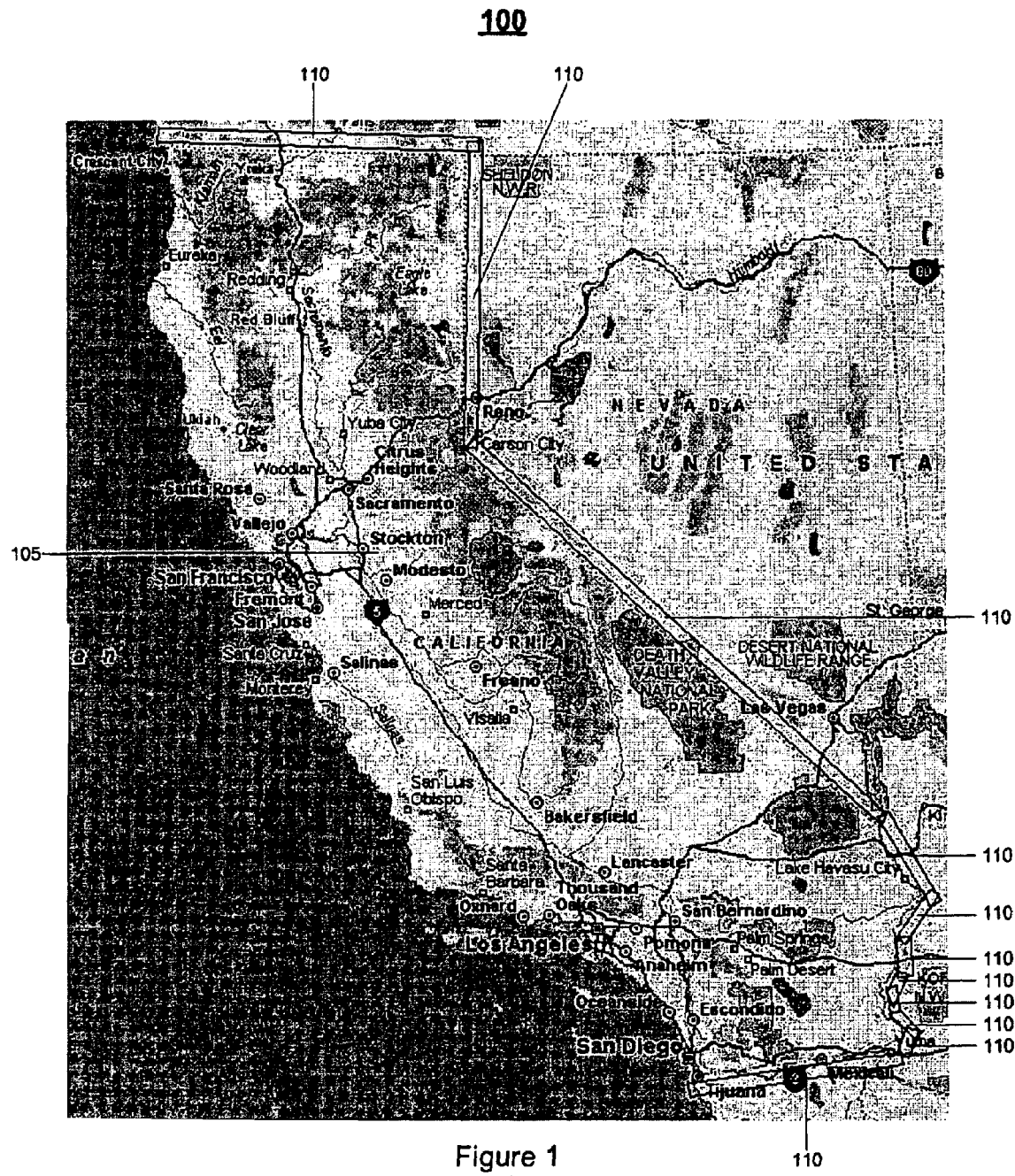
FIG. 1 is an illustrative example of a predefined boundary.

Initially, one or more boundaries are defined. For example, FIG. 1 shows a map 100 that depicts a jurisdiction 105, which in this case is the state of California. A jurisdiction is an area of land, such as a state or a province or any other governmental or nongovernmental geographic area. The map 100 has been augmented with a series of overlapping rectangles 110. The rectangles 110 define the approximate border between the California jurisdiction 105 and the other jurisdictions that are adjacent to the California jurisdiction 105. The current location of a mobile device whose movement across boundaries is monitored is compared to the locations of the boundary rectangles 110. When the current location of the vehicle or other mobile device is within one of the boundary rectangles 110, movement across the boundary of the California jurisdiction 105 into an adjacent jurisdiction has occurred.

Each boundary rectangle 110 also contains an identifier of the next jurisdiction that is entered as a result of entering the boundary rectangle 110. When a boundary rectangle 110 is entered, the boundary of a first jurisdiction has been crossed, and the current location is within a second jurisdiction. The identity of the second jurisdiction is indicated by the next jurisdiction identifier of the boundary rectangle 110 entered by the vehicle. Rectangles representing the boundary of the second jurisdiction are loaded to facilitate detection of movement across the boundary of the newly occupied, second jurisdiction. If no jurisdiction boundary data is available for the jurisdiction that will be occupied after a boundary crossing from the first jurisdiction, the next jurisdiction identifier for the rectangle 110 is left undefined. When a rectangle 110 with an undefined next jurisdiction identifier is entered, another jurisdiction boundary is not loaded.

Each boundary rectangle 110 may be defined by the Global Positioning Satellite (GPS) coordinates of two opposite corners of the rectangle 110. In one implementation, the boundary rectangles 110 may sit marginally outside the actual geopolitical boundary of a jurisdiction. A gap of a few meters between the actual jurisdiction boundary and the boundary rectangles 110 accounts for potential inaccuracies in detecting the precise location of a monitored vehicle or device and ensures that the actual jurisdiction boundary has actually been crossed when a boundary rectangle 110 is entered because the actual jurisdiction boundary will be encountered before the boundary rectangle 110 is entered (as opposed to merely passing near the boundary).

The gap also enables jurisdiction boundaries for adjacent jurisdictions to be defined without overlap. When the gap is included, no part of the jurisdiction boundary is within the jurisdiction. Instead, the boundary is completely within the adjacent jurisdictions. For example, when two jurisdictions are adjacent to one another, the boundary around the first jurisdiction will be located within the second jurisdiction, and the boundary around the second jurisdiction will be located within the first jurisdiction. Therefore, no overlap exists between the two jurisdiction boundaries.

If there is an overlap in the boundaries around two adjacent jurisdictions, then boundary crossings may be falsely detected. The overlap enables the mobile device being monitored to be located simultaneously within a boundary rectangle from multiple jurisdiction boundaries. While the mobile device occupies the area that is common to both jurisdiction boundaries, every check of the position of the mobile device being monitored until the mobile device has left the common area will lead to the erroneous determination that a boundary crossing has occurred. The boundaries that are loaded as a result of the apparent boundary crossing all contain the common area that is currently occupied, which leads to the repeated detection of a boundary crossing when only one boundary crossing has occurred. Therefore, in the above referenced implementation, the boundary rectangles 110 are placed a few meters (or miles) outside of the actual jurisdiction boundary so that no area of overlap exists among multiple boundaries. However, other techniques for overcoming the problem of overlapping boundaries around two adjacent jurisdictions leading to the erroneous detection of boundary crossings may be used, and the boundary rectangles 110 may overlap the actual jurisdiction boundary in other implementations.

Figure 2A:
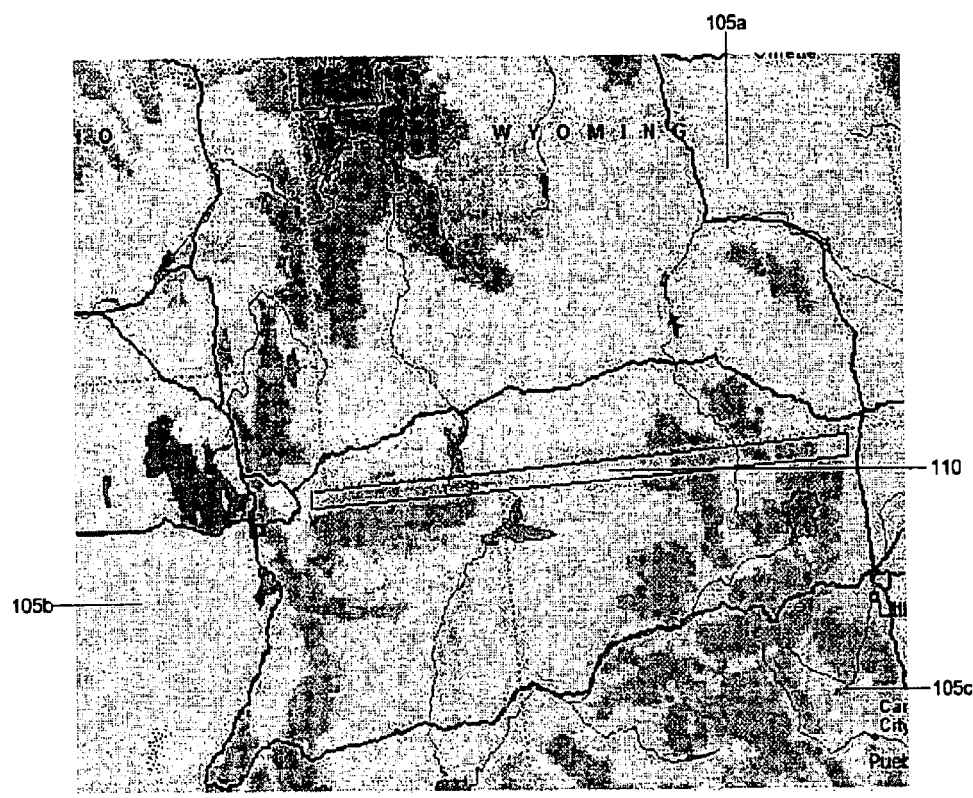
FIG. 2A is an illustrative example of an improperly defined boundary.

When defining the boundary rectangles for a jurisdiction, it may be desirable to ensure that there is only one possible jurisdiction that may be entered when entering a particular boundary rectangle. A potential problem arises when one state is adjacent to two other states along a single straight boundary. For example, FIG. 2A shows a representation of a geographical area in which a boundary is defined between a specific jurisdiction 105a, the state of Wyoming, and two adjacent jurisdictions 105b and 105c, the states of Utah and Colorado, respectively. The southern border of the Wyoming jurisdiction 105a is straight, so a single boundary rectangle 110 can be used to define the entire southern border. However, crossing the western side of the southern border leads to the Utah jurisdiction 105b, and crossing the eastern side of the southern border leads to the Colorado jurisdiction 105c. The next jurisdiction identifier of the boundary rectangle 110 can only indicate one jurisdiction that is entered when the southern border is crossed, even though there are two possibilities. Therefore, it is not possible to determine whether a monitored device is entering the Utah jurisdiction 105b or the Colorado jurisdiction 105c when entering the rectangle 110 by crossing the southern border.

Figure 2B:
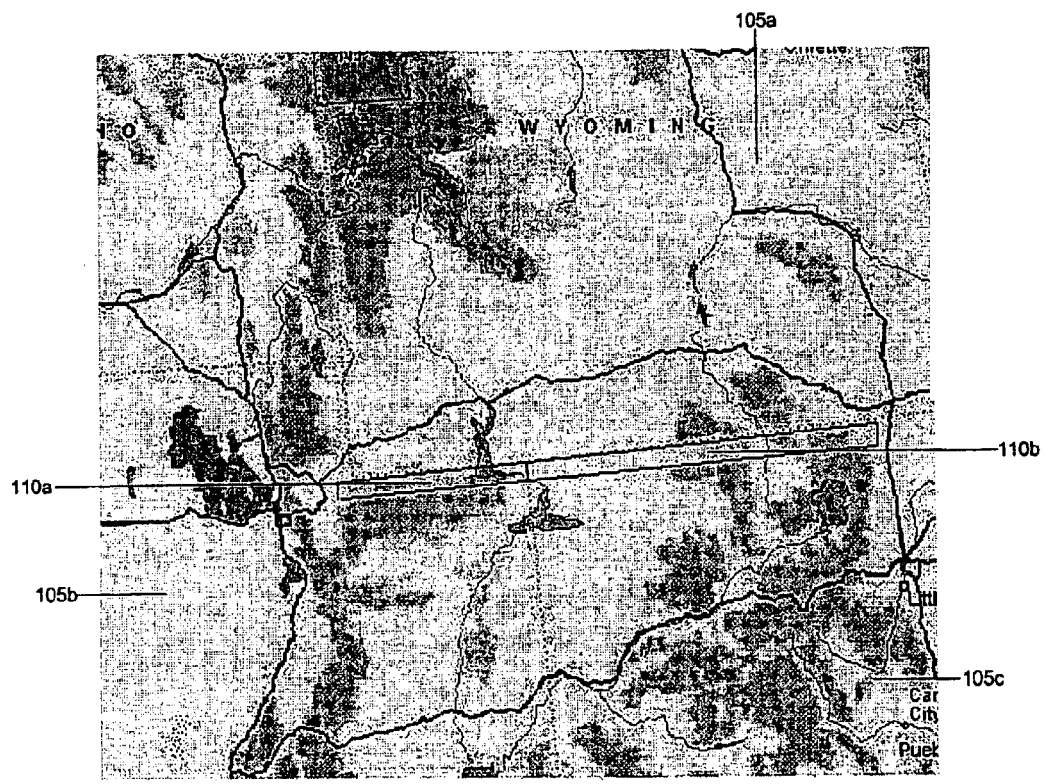
FIG. 2B is an illustrative example of a correction of the improperly defined boundary of FIG. 2A.

To avoid this potential ambiguity, and as shown in FIG. 2B, the southern boundary of the Wyoming jurisdiction 105a may be defined with two rectangles 110a and 110b that correspond to the Utah portion of the border and the Colorado portion of the border, respectively. The Utah rectangle 110a has its next jurisdiction identifier set for the Utah jurisdiction 105b, while the Colorado rectangle 110b has its next jurisdiction identifier set for the Colorado jurisdiction 105c. Therefore, when the Utah rectangle 110a is entered, the Utah jurisdiction 105b has been entered, and the border rectangles around the Utah jurisdiction 105b are loaded. Likewise, when the Colorado rectangle 110b is entered, the Colorado jurisdiction 105c has been entered, and the border rectangles around the Colorado jurisdiction 105c are loaded. Even though the southern border of the Wyoming jurisdiction 105a could be defined using a single rectangle 110, defining the southern border with two rectangles 110a and 110b provides a convenient way to determine which jurisdiction boundary should be loaded after a monitored device leaves the Wyoming jurisdiction 105a.

Figure 3:
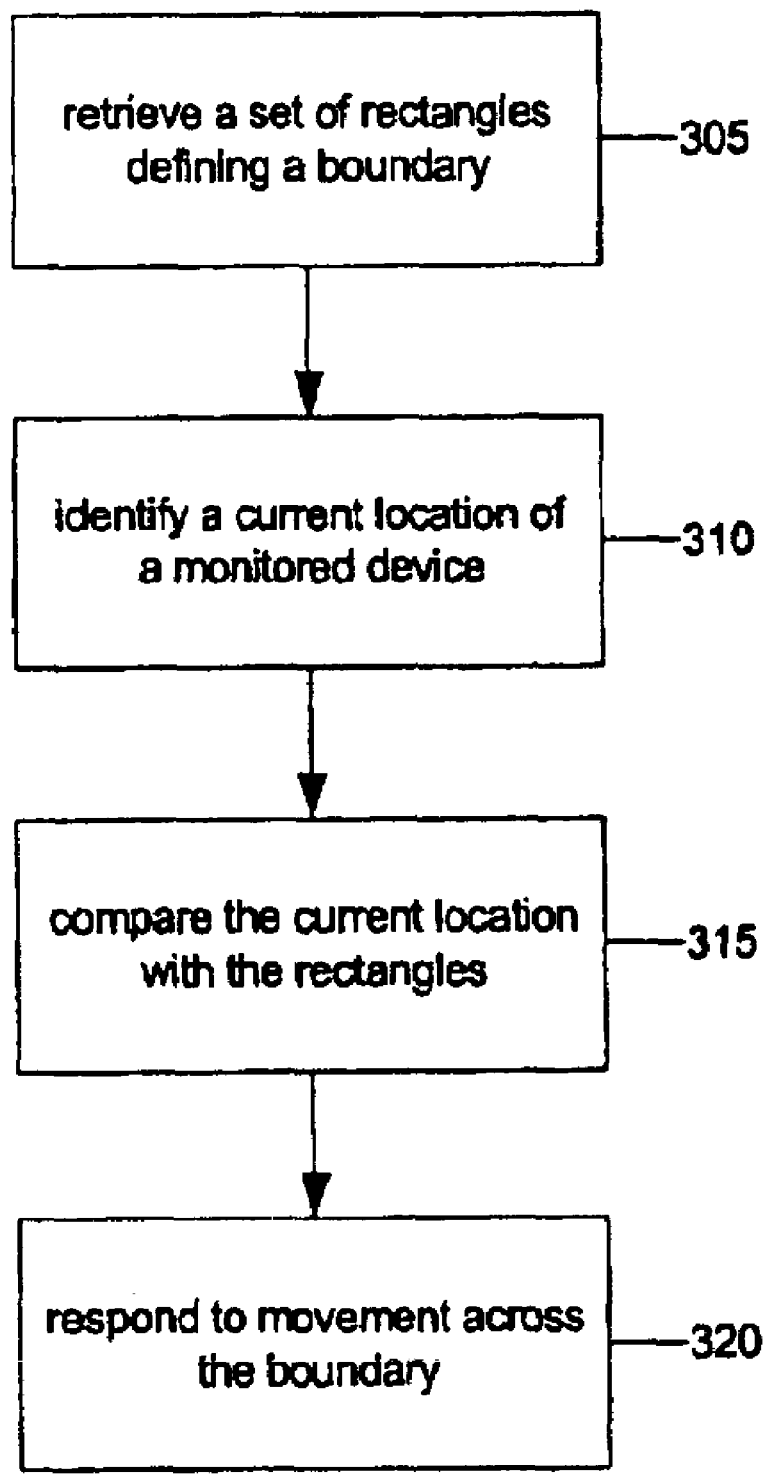
FIGS. 3 and 9 are flow diagrams of processes for detecting movement across a predefined boundary.

After a jurisdiction boundary is defined, the rectangles making up the jurisdiction boundary may be used to detect movement across the jurisdiction boundary. FIG. 3 illustrates a process 300 that uses the rectangles defining or approximating the jurisdiction boundary to determine when the jurisdiction boundary has been crossed by a monitored device. The process 300 may be implemented on the mobile device being monitored. Initially, a set of rectangles defining the boundary around the jurisdiction is received (step 305). The set of rectangles is stored for later use when detecting boundary crossings by the monitored device. A location of the monitored device is identified (step 310), and the location is compared to the set of rectangles that define the boundary around the jurisdiction (step 315). In particular, the location of the monitored device is compared to each of the rectangles in the set to determine if the monitored device is located within any one of the rectangles.

If the location of the monitored device is within one of the boundary rectangles, then the monitored device has moved across the jurisdiction boundary, and an appropriate response may be initiated (step 320). The response may include recording statistics relating to the operation of the monitored device and/or loading a different set of rectangles that define a boundary around a jurisdiction entered as a result of the boundary crossing. If the location of the monitored device is not within one of the boundary rectangles, then the jurisdiction boundary has not been crossed, and the location of the monitored device will continue to be monitored.

To facilitate the comparison of the location of the monitored device and the set of boundary rectangles, the boundary rectangles may go through a rotational transformation process that places the sides of each rectangle in the jurisdiction boundary parallel to the X-axis and the Y-axis of the chosen coordinate system. The rotational transformation process requires more processing resources when initially defining the jurisdiction boundary but makes subsequent calculations on the mobile device being monitored more efficient. The first step in the rotational transformation process is to determine an angle of rotation for each rectangle with respect to the X-axis of the coordinate system. This step may be performed on a desktop computer or other device with significant processing resources. Each rectangle is rotated about the origin by the angle so that the sides of the rectangle are parallel or perpendicular to the X-axis. The rotated rectangles are then stored on the mobile device. Subsequently, the mobile device monitors its position to determine if a boundary crossing has occurred. If the angle of rotation for a boundary rectangle is not equal to zero, then the coordinates of the current location go through the same rotational transformation as the corresponding rotated rectangle. The rotated GPS coordinates are then compared to the rotated coordinates of the corners of the rectangle to see if the current location is within the rectangle. If the sides of the rotated rectangles are parallel to the X-axis and Y-axis, the mobile device merely needs to compare the current position with the minimum and maximum X and Y values of a rectangle to determine if the current position is within the rectangle.

FIGS. 4A-4H illustrate a process for determining the angle 405 of rotation of a boundary rectangle 110 with respect to the X-axis of the coordinate system. Each boundary rectangle 110 has an assigned direction of rectangle consideration 410. The direction of rectangle consideration establishes the order in which the rectangles that define a jurisdiction boundary are analyzed. For example, the direction of rectangle consideration determines the order in which the boundary rectangles are rotated and the order in which the rectangles are used to determine if a boundary crossing has occurred. The direction of rectangle consideration for an exemplary rectangle points from a rectangle that is considered immediately before the exemplary rectangle to a rectangle that is considered immediately after the exemplary rectangle. Typically, the direction of rectangle consideration is assigned based on a clockwise or counter-clockwise traversal of the jurisdiction boundary. In other words, the rectangles are considered in the order in which they are encountered during a clockwise or counter-clockwise traversal of the jurisdiction boundary. A starting point for the traversal may be chosen arbitrarily. For example, when assigning a direction of rectangle consideration based on a clockwise traversal of the jurisdiction boundary, the rectangles along the north side of the boundary have a direction of rectangle consideration that generally points east, the rectangles along the east side of the boundary have a direction of rectangle consideration that generally points south, the rectangles along the south side of the boundary have a direction of rectangle consideration that generally points west, and the rectangles along the west side of the boundary have a direction of rectangle consideration that generally points north.

Typically, the direction of rectangle consideration 410 for a boundary rectangle is parallel to the longer side of the rectangle 110. The boundary rectangles 110 may be rotated until the direction of rectangle consideration 410 is parallel to the X-axis and points in the direction of increasing X.

To calculate the necessary angle 405 of rotation, the corners are numbered in a counter-clockwise fashion. Corner 1, labeled "P(X1,Y1)," is chosen such that the direction of rectangle consideration 410 points from corner 1 towards corner 2, labeled "P(X2,Y2)." Corner 3 is labeled "P(X3,Y3)," while corner 4 (see FIGS. 5A & 5B) may have coordinates "P(X4, Y4)." The angle between the side of the rectangle 110 between corners 1 and 2 and the positive X-axis of the coordinate system defines the angle 405 by which the rectangle 110 is rotated. Alternatively, the angle between the side of the rectangle 110 between any other two consecutive corners (e.g., corners 2 and 3, corners 3 and 4, or corners 4 and 1), and the positive or negative X-axis or the positive or negative Y-axis also may be used. The necessary angle 405 of rotation is determined under the assumption that the boundary rectangles 110 are rotated in a clockwise direction.

Figure 4A:
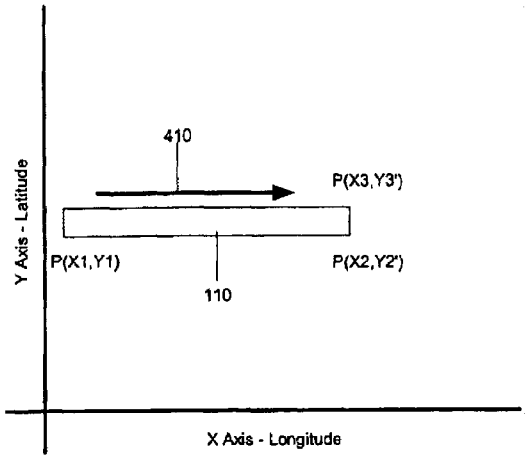
FIGS. 4A-4H are diagrams illustrating the determination of the angle of rotation for the rectangles in the boundary.
Figure 4B:
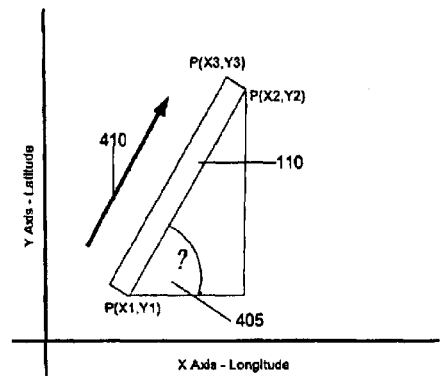
Figure 4C:
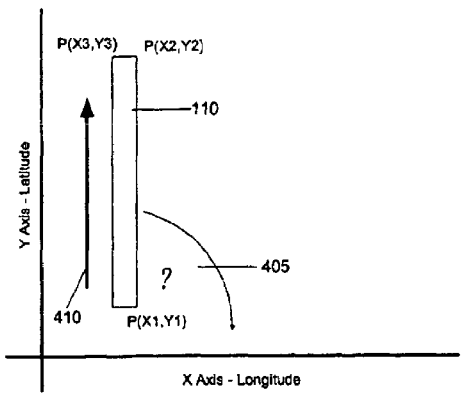

For example, rotation is necessary for the boundary rectangle 110 from FIG. 4B because the sides of the rectangle 110 are not parallel to either the X-axis or the Y-axis and with the direction of rectangle consideration oriented in the positive X direction. The necessary angle 405 of rotation can be determined from the angle between the positive X-axis and the side of the rectangle defined by corners 1 and 2. In this example, X1 is the X coordinate of corner 1, Y1 is the Y coordinate of corner 1, X2 is the X coordinate of corner 2, Y2 is the Y coordinate of corner 2, and $\alpha$ is the angle 405 of rotation. For purposes of illustrating the determination of the angle 405 of rotation, an imaginary right triangle is formed with the side of the rectangle between corners 1 and 2 as the hypotenuse. The length of the side of the right triangle opposite the angle $\alpha$, $\Delta Y$, is determined by:

$$\Delta Y = Y2 - Y1,$$

and the length of the side of the triangle adjacent the angle $\alpha$, $\Delta X$, is determined by:

$$\Delta X = X2 - X1,$$

The angle of rotation $\alpha$ can then be determined by:

$$\alpha = \arctan(\Delta Y/\Delta X) \times (-1),$$

where the result of the arctangent function is the angle between the selected side of the rectangle and the positive X-axis, and the multiplication by $-1$ is used to produce a clockwise rotation.

Figure 4D:
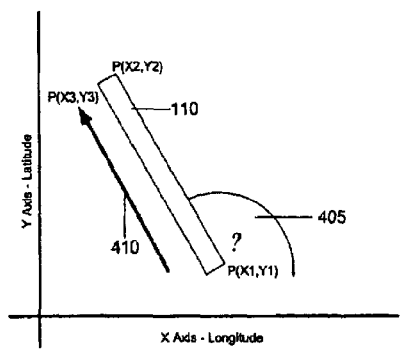
Figure 4E:
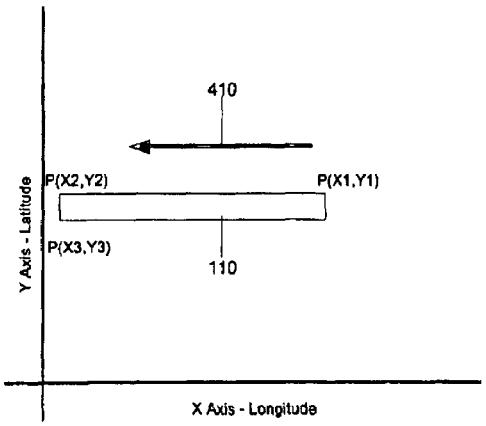
Figure 4F:
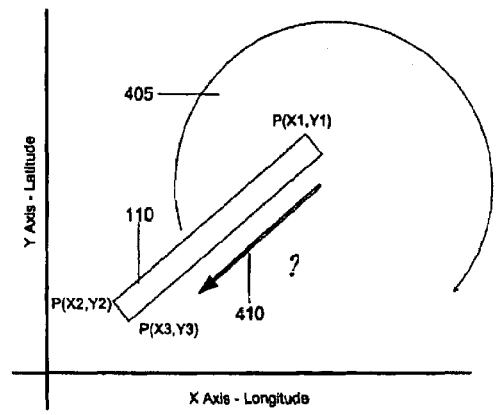
Figure 4G:
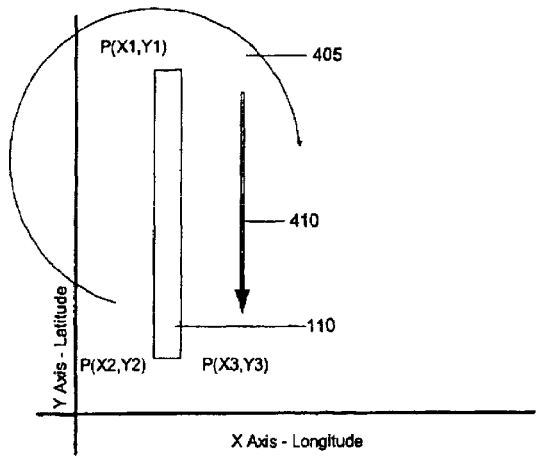
Figure 4H:
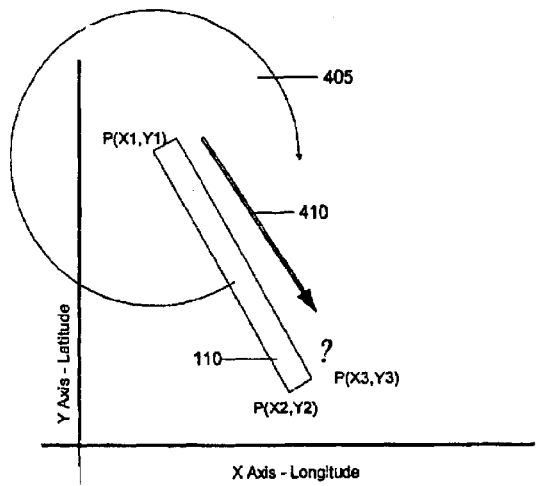

Similar calculations may be used for the other possible orientations of boundary rectangles 110 depicted in FIGS. 4D, 4F, and 4H. For example, when calculating the angle 405 of rotation for the rectangle 110 in FIG. 4D, the same method is used to calculate $\Delta Y$ with respect to FIG. 4B. However, $\Delta X$ is determined by:

$$\Delta X = (X2 - X1) \times -1,$$

where the multiplication by $-1$ is used to make $\Delta X$ positive, because X1 is greater than X2. The angle of rotation $\alpha$ is determined by:

$$\alpha = (\pi - \arctan(\Delta Y/\Delta X)) \times (-1),$$

where the subtraction of the result of the arctangent function from $\pi$ and the multiplication by $-1$ are used to produce a clockwise rotation that points the direction of rectangle consideration 410 for the rectangle 110 in the positive X direction.

In FIG. 4F, $\Delta Y$ is determined by:

$$\Delta Y=(Y2-Y1)\times -1,$$

where the multiplication by −1 is used to make $\Delta Y$ positive, since Y1 is greater than Y2. $\Delta X$ is determined by:

$$\Delta X=(X2-X1)\times -1,$$

where the multiplication by −1 is used to make $\Delta X$ positive, because X1 is greater than X2. The angle of rotation $\alpha$ is determined by:

$$\alpha=(\pi+\arctan(\Delta Y/\Delta X))\times(-1),$$

wherein the addition of the result of the arctangent function to $\pi$ and the multiplication by −1 are used to produce a clockwise rotation that points the direction of rectangle consideration 410 for the rectangle 110 in the positive X direction.

In FIG. 4H, $\Delta X$ is determined in the same way as was done with respect to FIG. 4B, but $\Delta Y$ is determined by:

$$\Delta Y=(Y2-Y1)\times -1.$$

where the multiplication by −1 is used to make $\Delta Y$ positive, because Y1 is greater than Y2. The angle of rotation $\alpha$ is determined by:

$$\alpha=((2\pi)-\arctan(\Delta Y/\Delta X))\times(-1),$$

where the subtraction of the result of the arctangent function from $2\pi$ and the multiplication by −1 are used to produce a clockwise rotation that points the direction of rectangle consideration 410 for the rectangle 110 in the positive X direction.

Certain orientations of the boundary rectangles 110 shown in FIGS. 4A, 4C, 4E, and 4G require an angle 405 of rotation that is a negative multiple of 90° because the direction of rectangle consideration 410 is parallel to the axes of the coordinate system. For example, no rotation is necessary for the boundary rectangle 110 from FIG. 4A because the direction of rectangle consideration 410 already points in the positive X direction. On the other hand, the direction of rectangle consideration 410 of the rectangle 110 from FIG. 4C, which points in the positive Y direction, dictates that the rectangle 110 should be rotated by −90°. Similarly, the rectangle 110 from FIG. 4E should be rotated by −180° because the direction of rectangle consideration 410 points in the negative X direction, while the rectangle 110 from FIG. 4G should be rotated by −270° because the direction of rectangle consideration 410 points in the negative Y direction.

Figure 5A:
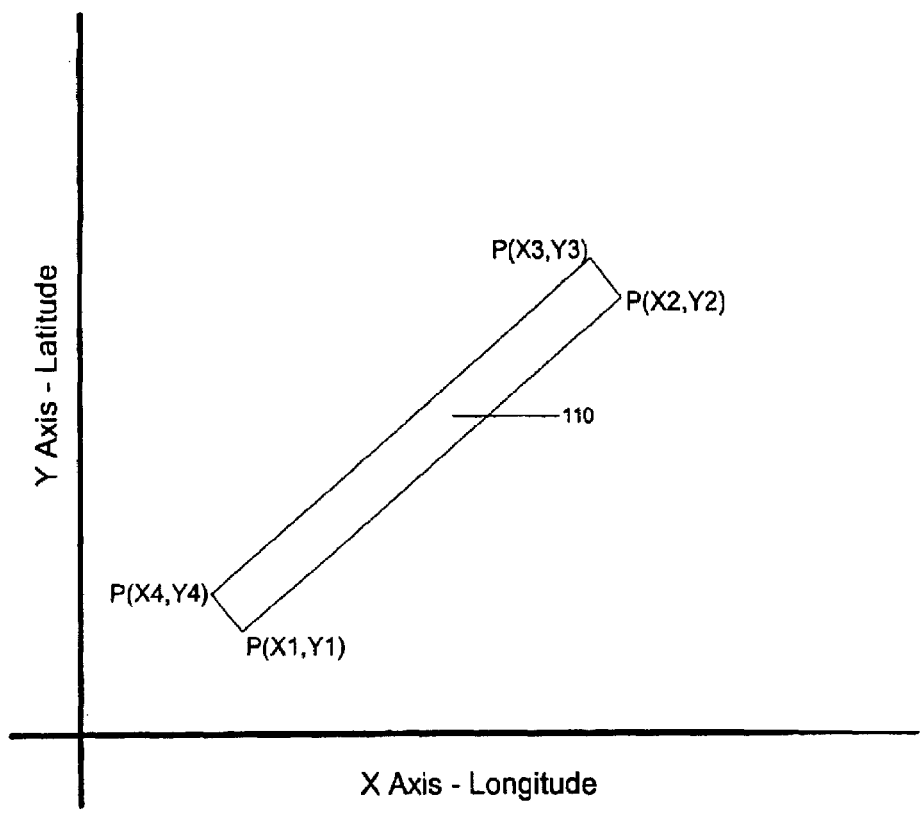
FIGS. 5A and 5B are diagrams illustrating a process for ordering the coordinates that define each rectangle in the boundary
Figure 5B:
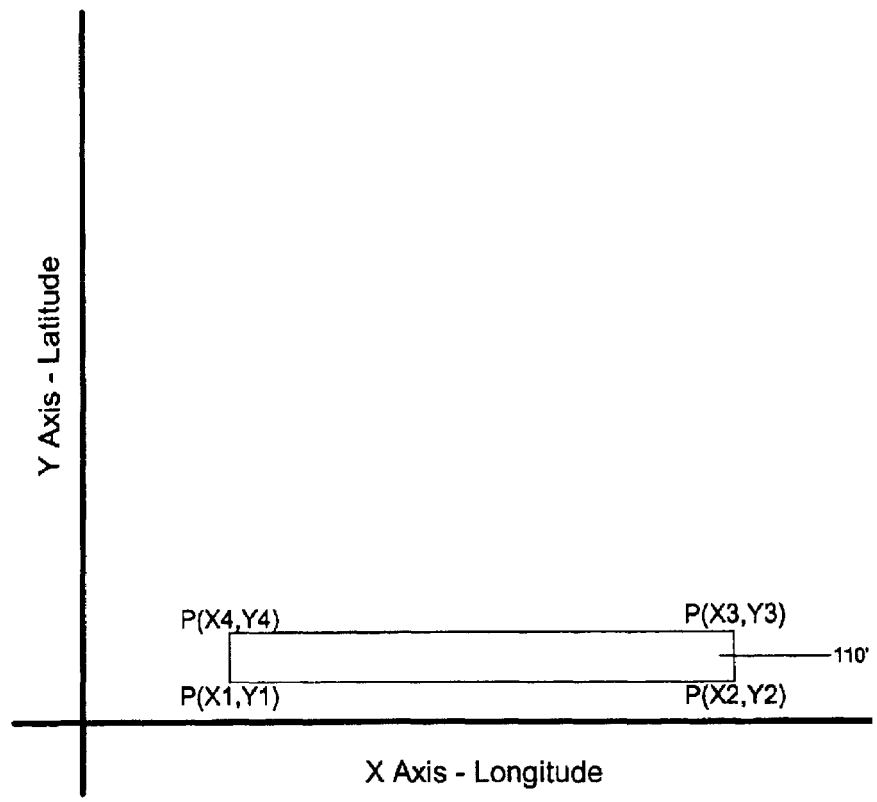

Alternatively or additionally, the angle 405 of rotation can be determined without considering the direction of rectangle consideration of the boundary rectangle 110. FIGS. 5A and 5B illustrate a process for ordering the coordinates that define each boundary rectangle 110 such that the orientation of the rectangle relative to the direction of rectangle consideration is not important. Similarly, either a longer or a shorter side of the rectangle may be made parallel to the X-axis (or the Y-axis). In accordance with the illustrated numbering scheme, when the rectangle sides are not parallel with the X- and Y-axes, corner 1, labeled "P(X1,Y1)," is the corner with the minimum Y value. In cases where the boundary rectangle 110 has sides parallel to the X- and Y-axes, corner 1 is the corner of the boundary rectangle 110 that has the minimum X value and minimum Y value. In either case, the other corners are defined in a counterclockwise manner with respect to corner 1.

The rectangle 110 is rotated about the origin until the sides of the rectangle 110 are parallel or perpendicular to the X-axis and Y-axis of the coordinate system, producing a rotated rectangle 110', as shown in FIG. 5B. In the illustrated example, the rectangle 110 is rotated until the side of the rectangle 110 between corners 1 and 2 is parallel to the X-axis. To calculate the angle of rotation needed to rotate the boundary rectangle 110 into the rotated rectangle 110', an imaginary right triangle is formed with the side of the rectangle 110 between corners 1 and 2 as the hypotenuse. In this example, X1 is the X coordinate of corner 1, Y1 is the Y coordinate of corner 1, X2 is the X coordinate of corner 2, Y2 is the Y coordinate of corner 2, and $\alpha$ is the angle 405 of rotation. The length of the side of the right triangle opposite the angle $\alpha$, $\Delta Y$, is determined by:

$$\Delta Y=Y2-Y1,$$

and the length of the side of the triangle adjacent the angle $\alpha$, $\Delta X$, is determined by:

$$\Delta X=X2-X1.$$

The angle of rotation $\alpha$ can then be determined by:

$$\alpha=\arctan(\Delta Y/\Delta X)\times(-1),$$

where the multiplication by −1 is used to produce a clockwise rotation.

It will be recognized that the foregoing procedures for determining the angle of rotation $\alpha$ are illustrative only and that the angle of rotation $\alpha$ also may be determined in other ways. For example, boundary rectangle sides other than the one between corners 1 and 2 can be used. In addition, the rectangle 110 might also be rotated in a counterclockwise direction by an angle $\beta$ that equals 360°−$\alpha$, 270°−$\alpha$, 180°−$\alpha$, 90°−$\alpha$, or some other multiple of 90°. Moreover, instead of calculating the angle $\alpha$ using the arctangent function, an arccosine or arcsine function also may be used.

Figure 6A:
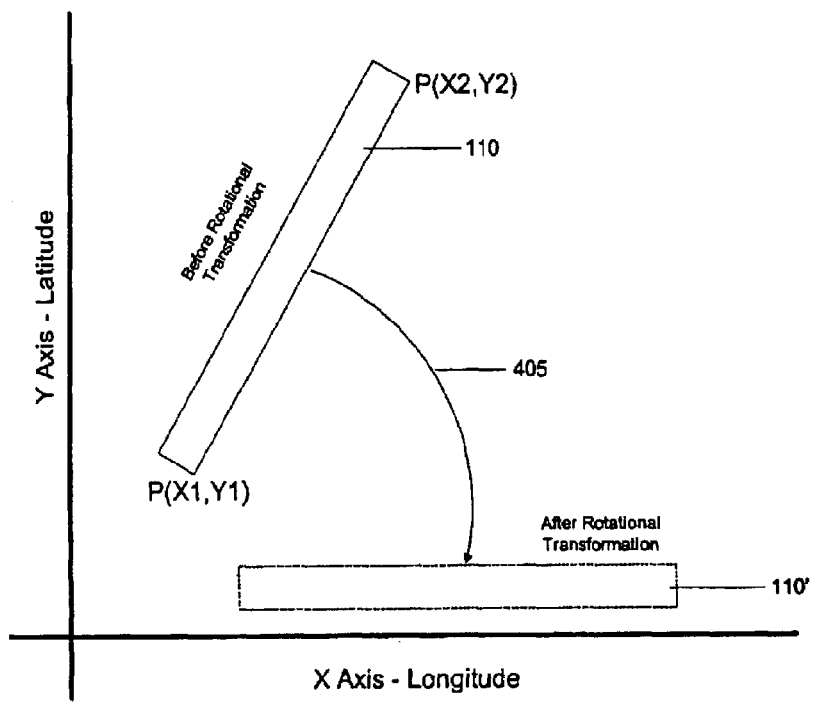
FIG. 6A is a diagram illustrating the rotational transformation of a rectangle in the boundary.

FIG. 6A shows a rotational transformation of a boundary rectangle 110 into a rotated rectangle 110' that is parallel to the X-axis and the Y-axis. The rotational transformation can be accomplished by calculating the rotated coordinates, X' and Y', for each corner of the rectangle 110 using the following equations:

$$X'=X\cos(\alpha)-Y\sin(\alpha)$$

$$Y'=X\sin(\alpha)+Y\cos(\alpha)$$

where $\alpha$ is the angle 405 of rotation and X and Y are the un-rotated coordinates of a corner of the boundary rectangle 110. Although it is possible to transform all four corners using these equations, it is generally sufficient to transform the two sets of coordinates representing opposite corners because these two sets of coordinates are sufficient to define the rotated rectangle 110'. Thus, the X and Y coordinates for each of corners 1 and 3 of the original rectangle 110, for example, can be plugged into the above equations to generate the coordinates for corners 1 and 3 of the rotated rectangle 110'. As with the determination of rotational angles, the actual rotation of the boundary rectangle 110 may be performed on a desktop computer or other device with significant processing resources.

Jurisdiction boundaries may be saved in files on the device being monitored. In one possible implementation, one jurisdiction boundary (e.g., representing the boundary of one state) may be saved in each file. Thus, each file may contain multiple rectangles. The jurisdiction files may be named according to the jurisdiction boundary that they contain. For example, a possible jurisdiction file naming convention is "<jurisdiction identifier>-<jurisdiction name>.jsd", where <jurisdiction-identifier> is a short integer identifier for a jurisdiction, and <jurisdiction name> is a descriptive name of the jurisdiction, such as "California". For each rectangle in the jurisdiction boundary contained in the file, the angle of rotation α, the rotated coordinates of two opposite corners of the rectangle, and an identifier for the next jurisdiction may be included in the file. In addition, a header appears at the top of the file to identify the jurisdiction whose boundary is contained in the file and to specify the number of rectangles in the boundary.

In one implementation, bytes 1 and 2 of the file are a short integer representing the identifier of the jurisdiction. Bytes 3 and 4 of the file are a short integer indicating the number of rectangles in the jurisdiction boundary. The rest of the file consists of 22 byte segments. One 22-byte segment exists for every rectangle in the jurisdiction boundary. Bytes 1-4 of each segment are a floating point number representing the rotated X coordinate of a first corner of the rectangle, and bytes 5-8 of each segment are a floating point number representing the Y coordinate of the first corner of the rectangle. Similarly, bytes 9-12 of each segment are a floating point number representing the rotated X coordinate of a second corner of the rectangle opposite to the first corner, and bytes 13-16 of each segment are a floating point number representing the Y coordinate of the second corner of the rectangle. Bytes 17-20 are a floating-point number representing the angle in radians by which the first and the second corner were rotated. Finally, bytes 21 and 22 are a short integer representing the next jurisdiction identifier for the rectangle. In an alternative implementation, the coordinates may be stored in an XML format by the mobile device being monitored.

The mobile or embedded device stores files for one or more jurisdictions and, in operation, reads the file for the jurisdiction that the device currently occupies. A GPS receiver periodically determines the position of the vehicle or device to be monitored. Alternatively, the position of the vehicle can be determined using another type of locating system, such as a system of terrestrial towers that transmit signals to and/or receive signals from a receiver/transmitter located in or on the vehicle. Such a system can use propagation times between the vehicle and the terrestrial towers to triangulate the vehicle's position. This type of triangulation system can be implemented, for example, using a cellular telecommunication infrastructure. The device compares the current position of the monitored device with each of the rotated rectangles in the file for the current jurisdiction.

When a current position of the vehicle is to be compared with a particular rectangle, the positional coordinates (e.g., GPS coordinates) of the current position are first rotated, if necessary, by the angle of rotation of the particular rectangle. If the stored angle of rotation is zero, then no rotation of the positional coordinates is performed. On the other hand, if the angle α is not equal to zero, the positional coordinates go through the same rotational transformation as the corresponding rotated rectangle. The mobile or embedded device then checks to see if the positional coordinates are within the rotated rectangle 110' by performing simple comparisons with the corners of the rotated rectangle 110'. If the vehicle is not within the current rotated rectangle 110', then another rotated rectangle from the jurisdiction boundary is checked until all of the rotated rectangles in the file have been checked. Typically, the rotated rectangles may be checked sequentially in the order in which they are stored in the file (e.g., the rotated rectangles may be stored in an order that represents a clockwise traversal of the entire jurisdiction boundary). If the vehicle is not in any of these rotated rectangles 110' associated with the current jurisdiction, then the vehicle has not crossed the boundary around the jurisdiction.

Figure 6B:
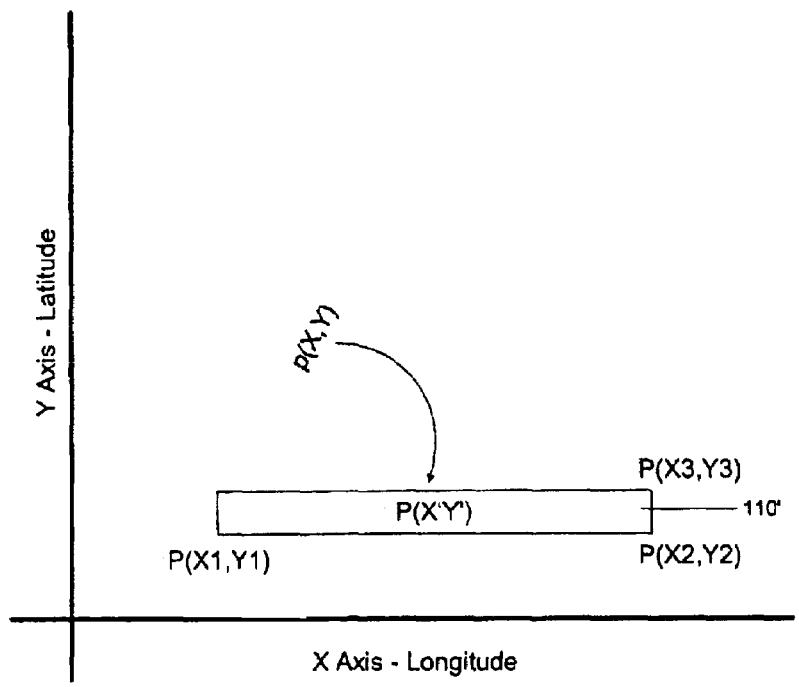
FIG. 6B is a diagram illustrating the rotational transformation of a set of positional coordinates

FIG. 6B illustrates the rotational transformation of a set of positional coordinates. This transformation uses the same equations as the transformation of the boundary rectangles 110 performed before the coordinates of the rotated rectangle 110' are saved on the mobile or embedded device. In particular, the positional coordinates are rotated using:

$$X'=X\cos(\alpha)-Y\sin(\alpha)$$

$$Y'=X\sin(\alpha)+Y\cos(\alpha)$$

where X and Y are the positional coordinates before rotation, α is the angle of rotation, and X' and Y' are the rotated positional coordinates. The rotated positional coordinates are then compared with the coordinates of the rotated rectangle 110'. If X' is between the rotated X coordinates of the opposite corners of the current rectangle 110 and Y' is between the rotated Y coordinates of the opposite corners of the current rectangle 110, then the vehicle is within the current rectangle 110.

The majority of the calculations performed to define a boundary and determine whether a set of coordinates lie inside the defined boundary are performed on a desktop machine or other computer with a significant amount of processing power. The results of these calculations are saved within a boundary definition and loaded on the mobile or embedded device. As a result, the mobile or embedded device needs to perform relatively few calculations, which permits the use of less powerful and less expensive CPUs to perform the boundary detection function.

Figure 7:
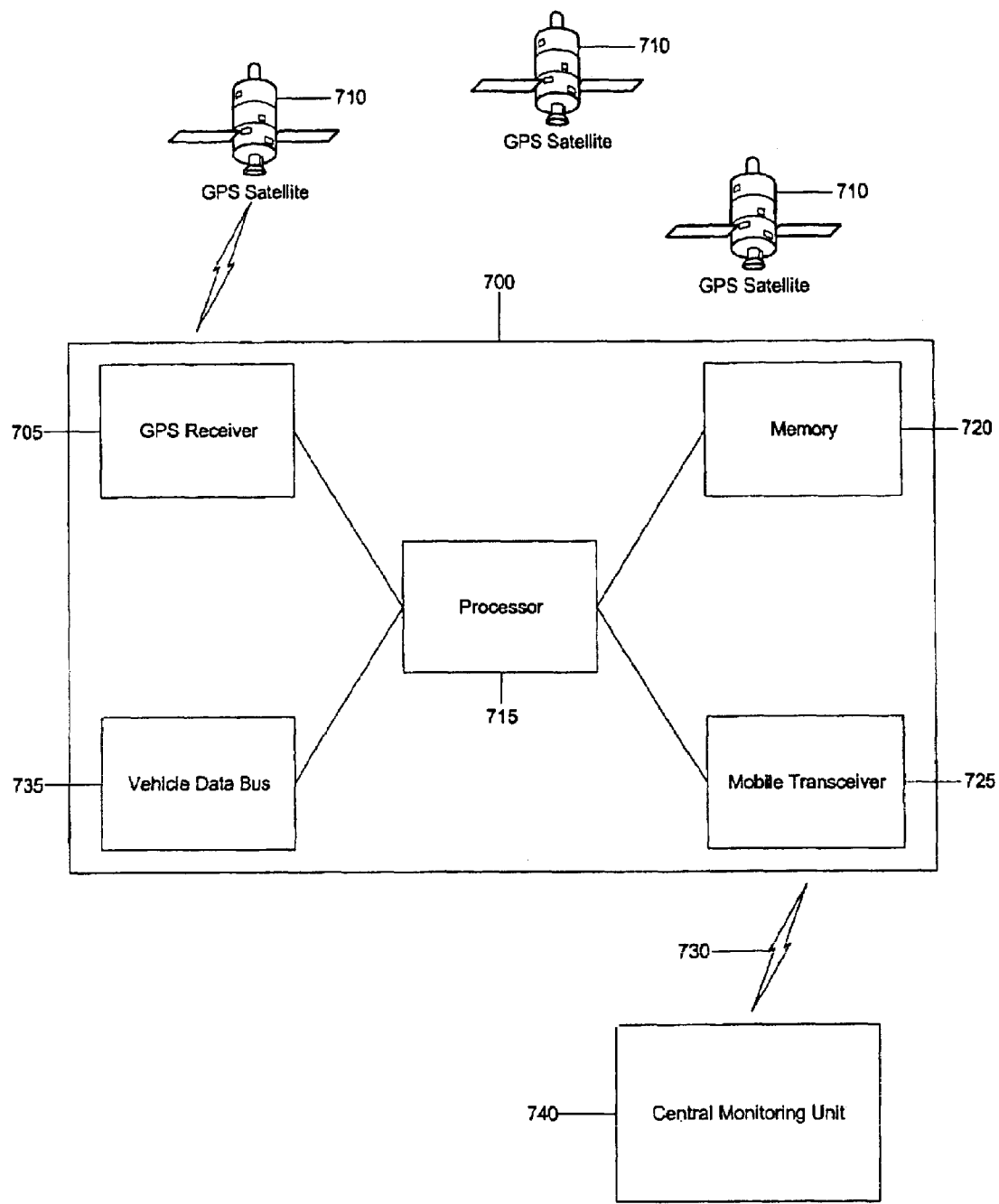
FIG. 7 is a diagram of a representative system for detecting movement of a mobile device across a boundary.

FIG. 7 illustrates a representative system for detecting the movement of a mobile device 700 across a boundary. The mobile device 700 represents a vehicle or any other device for which movement across a boundary is to be monitored. The mobile device 700 includes a GPS receiver 705 that can determine the current position of the mobile device 700 based on signals received from multiple GPS satellites 710. The mobile device 700 also includes a processor 715. The processor 715 can be part of an embedded device (e.g., an onboard computer with limited functionality) or can be a general use processor that is included in or on the mobile device 700.

A memory 720 stores one or more jurisdiction boundary definitions. Each boundary definition includes a series of rotated rectangles 110' that, prior to being loaded into the memory 720, have been rotated to be parallel to the axes of the GPS coordinate system. In addition, the jurisdiction boundary definitions include an angle of rotation corresponding to each rotated rectangle 110'. The jurisdiction boundary definitions can be loaded into the memory 720 through a wired or wireless interface. For example, the jurisdiction boundary description may be loaded into the memory 720 from a mobile transceiver 725 that receives the jurisdiction boundary description over a radio interface 730.

The processor 715 operates to periodically receive from the GPS receiver 705 a set of GPS coordinates that identify the mobile device's current position. The processor 715 then transforms the received set of coordinates using the stored angle of rotation of a rotated rectangle from the boundary of the jurisdiction that is currently occupied, and compares the rotated coordinates to the corresponding rotated rectangle 110' stored in the memory 720, as described above.

If the processor 715 determines that the mobile device 700 has entered a rotated rectangle defined by the jurisdiction boundary description, the processor 715 initiates a predetermined response. For example, the processor 715 may use a vehicle data bus 735 to determine the odometer and fuel gauge readings in an implementation where fuel use and distance traveled within a jurisdiction are monitored. The processor 715 may then use the radio interface 730 to send a message containing the vehicle statistics from the mobile transceiver 725 to a central monitoring unit 740. The message can be sent using any type of wireless communication infrastructure, such as a cellular telecommunication system (not specifically shown), that forwards the message to the central monitoring unit 740 over a radio interface 730. The central monitoring unit 740 may include a server or other type of processor that takes some predetermined action in response to the received message, such as logging the vehicle statistics in a database or performing some calculations based on the received statistics. As an alternative to wirelessly communicating vehicle statistics and/or an indication of a boundary crossing, the processor 715 of the mobile device 700 may simply log the information in a database stored in the memory 720 for later transfer to the central monitoring unit 740.

Figure 8:
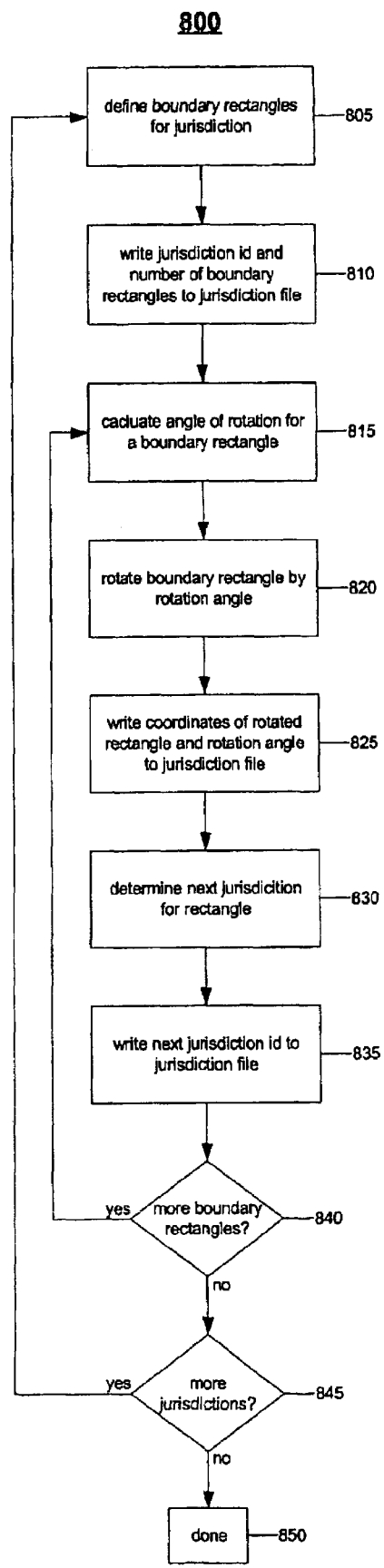
FIG. 8 is a flow diagram of a process for defining and storing boundaries.

FIG. 8 illustrates a process 800 for defining boundaries between a set of jurisdictions so that movement across the boundaries can be detected. A boundary around each jurisdiction is defined, processed, and stored so that the boundary can be used when the mobile device being monitored is within the jurisdiction. The process 800 begins with defining a boundary of a jurisdiction in a coordinate system (step 805). As discussed above, the boundary may be a series of overlapping rectangles 110. In such a case, each rectangle 110 may represent a segment of the overall boundary. Each rectangle 105 may be defined by two sets of coordinates that represent two opposite corners of the rectangle. The number of rectangles in the jurisdiction boundary, along with an identifier of the jurisdiction whose boundary is being defined, is written to a file that specifies the boundary of the jurisdiction (step 810). One possible file format is described above, although other formats may be used.

Next, a first segment is set as the current segment, and an angle $\alpha$ is calculated for a current segment of the boundary (step 815). The angle $\alpha$ is the angle between a straight edge of the segment and one of the axes of the coordinate system. Thus, the angle $\alpha$ may be the angle between one side of a rectangle and the X-axis or the Y-axis of a chosen coordinate system. The current boundary segment is then rotated (step 820) by the angle $\alpha$ that corresponds to the segment, and the rotated coordinates and the angle $\alpha$ for the current segment are written to the jurisdiction boundary specification file (step 825). The jurisdiction boundary specification files may be stored in a memory located in the vehicle or other mobile device to be monitored.

In a properly defined jurisdiction boundary, each segment of the overall boundary corresponds to a particular adjacent jurisdiction, and an identifier of the particular adjacent jurisdiction is determined (step 830). The next jurisdiction identifier is written to the jurisdiction boundary specification file (step 835) and is associated with the current segment.

A determination is made as to whether one or more additional boundary segments exist in the jurisdiction boundary (step 840). If so, the angle $\alpha$ is calculated for the next boundary segment (step 815), the boundary segment is rotated (step 820), the rotated segment coordinates and the corresponding angle $\alpha$ are written to the appropriate file (step 825), the adjacent jurisdiction corresponding to the boundary segment is determined (step 830), the next jurisdiction identifier is written to the appropriate file (step 835), and it is determined again if at least one additional boundary segment exists (step 840). In this manner, steps 815, 820, 825, 830, and 835 may be repeated until all of the boundary segments in the boundary have been processed.

When all of the boundary segments in a single jurisdiction boundary have been processed, a determination is made as to whether a boundary for one or more additional jurisdictions needs to be defined (step 845). If so, the entire process of defining the jurisdiction boundary as a set of overlapping rectangles, processing each of the rectangles in the jurisdiction boundary, and writing the appropriate information to the jurisdiction boundary specification file is repeated until the boundaries of all the jurisdictions have been defined and processed, at which point, the process 800 is complete (step 850).

Figure 9:
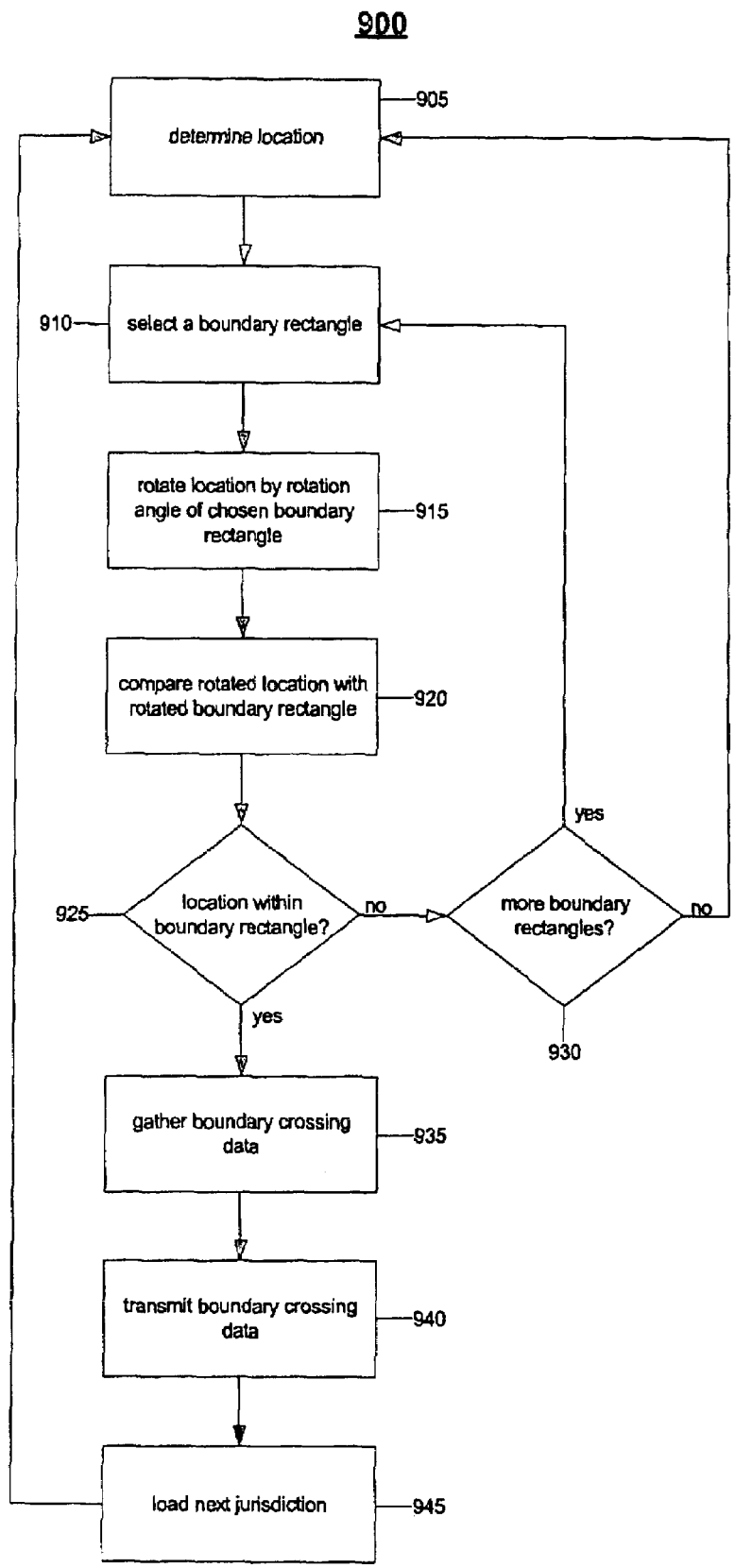

FIG. 9 illustrates a process 900 for using the processed jurisdiction boundaries to detect movement of a mobile device across one of the jurisdiction boundaries. Initially, a mobile device to be monitored is assumed to be located within a jurisdiction. A current location of the device to be monitored is determined using, for example, a GPS receiver or other locating system (step 905).

The current location of the device is compared with a boundary of the currently occupied jurisdiction. To this end, a current segment from the set of boundary rectangles defining the jurisdiction boundary is selected (step 910). The coordinates of the current location are rotated by the angle $\alpha$ associated with the current segment (step 915). The rotated coordinates of the current location are then compared with the rotated coordinates of the selected segment (step 920). Based on the comparison, it is determined if the current location represents a boundary crossing (i.e., based on whether the current location is within the selected segment) (step 925). If not, it is determined if more boundary rectangles need to be checked (step 930). If so, another boundary rectangle is selected (step 910), the current location is rotated by the rotation angle associated with the selected segment (step 915), the rotated coordinates of the current location are compared with the rotated coordinates of the selected segment (step 920), and it is determined again if the current location represents a boundary crossing. In this manner, steps 910, 915, and 920 may be repeated until the current location is found to represent a boundary crossing.

If no additional boundary rectangles exist to be checked and a boundary crossing has not been detected, then it may be assumed that the device remains within the current jurisdiction. Accordingly, the current location is again determined after some delay period of variable or constant length (e.g., 15 seconds) (step 905), and the newly determined current location is tested to determine if the jurisdiction boundary has been crossed. The length of the delay period is generally selected such that a vehicle or other monitored device is not capable of passing through or crossing the width of the rectangle between determinations of the current location and comparing the current location to the set of boundary rectangles. Alternatively, the width of the boundary rectangles may be selected according to a desired frequency of comparisons. In general, wider rectangles require less frequent comparisons. As one example, use of one-mile wide rectangles may be combined with a 15 second delay period.

If the current location is determined to be within the selected segment (step 925), then the jurisdiction boundary has been crossed, and a predetermined response to a boundary crossing is initiated. For example, data necessary to identify and report the boundary crossing may be gathered (step 935). The data may be logged in a database stored on the mobile device for later retrieval, or the data may be transmitted to a central monitoring unit that monitors the movement of the mobile device across the jurisdiction boundaries (step 940). Finally, a next jurisdiction identifier of the segment currently occupied by the mobile device is retrieved, and the jurisdiction boundary for the jurisdiction corresponding to the next jurisdiction identifier is loaded (step 945). The current location is again determined after some delay period of variable or constant length (step 910), and the current location is tested to determine if the newly loaded jurisdiction boundary has been crossed.

A number of implementations have been described. Nevertheless, it will be understood that various modifications may be made. For example, the steps of the described processes may be rearranged. Accordingly, other implementations are within the scope of the following claims.

What is claimed is:

1. A method for detecting a crossing of a boundary, the method comprising:
   receiving a representation of a boundary within a coordinate system, wherein the boundary is defined by at least one rectangle;
   receiving a set of coordinates associated with a location of a monitored device;
   rotating, by a processor, the received set of coordinates by an angle between a selected side of a particular rectangle of the boundary and an axis of the coordinate system; and
   comparing, by the processor, the rotated set of coordinates to a rotated rectangle to determine whether the location of the monitored device is located within the particular rectangle, wherein the particular rectangle is rotated by the angle to form the rotated rectangle such that the selected side of the rotated rectangle is oriented parallel to the axis of the coordinate system.

2. The method of claim 1 wherein a boundary crossing is detected if the location of the monitored device is located within the particular rectangle.

3. The method of claim 2 further comprising initiating a pre-selected response if a boundary crossing is detected.

4. The method of claim 3 wherein the pre-selected response includes
   determining a new jurisdiction entered as a result of the boundary crossing;
   loading a boundary for the new jurisdiction; and
   detecting a crossing of the new jurisdiction boundary.

5. The method of claim 3 wherein the pre-selected response includes gathering information related to the boundary crossing.

6. The method of claim 5 wherein the monitored device comprises a vehicle and the gathered information includes at least one of a distance traveled and an amount of fuel used by the vehicle.

7. The method of claim 5 wherein the gathered information is sent over a wireless interface to a central server.

8. The method of claim 5 wherein the gathered information is stored on the device being monitored.

9. The method of claim 1 wherein the boundary is defined by a collection of overlapping rectangles, the method further comprising selecting a different rectangle of the collection of overlapping rectangles if the location of the monitored device is not located within the particular rectangle.

10. The method of claim 9 further comprising:
    storing information representing the different rectangle rotated by an angle between a selected side of the different rectangle and an axis of the coordinate system such that the selected side of the rotated different rectangle is oriented parallel to the axis of the coordinate system;
    rotating the received set of coordinates by the angle between the selected side of the different rectangle and the axis of the coordinate system to generate a second set of rotated coordinates; and
    comparing the second set of rotated coordinates to the rotated different rectangle to determine whether the location of the monitored device is located within the different rectangle.

11. The method of claim 1 wherein:
    the particular rectangle is defined by coordinates of two opposite corners of the rectangle;
    the rotated rectangle is generated by rotating the coordinates of the two opposite corners of the rectangle by the angle; and
    comparing the rotated set of coordinates to the rotated rectangle comprises comparing the rotated set of coordinates to the rotated coordinates of the two opposite corners of the rectangle.

12. The method of claim 1 wherein the defined boundary represents a border between a first jurisdiction and a second adjacent jurisdiction.

13. The method of claim 1 wherein the defined boundary is stored as a file by the monitored device.

14. The method of claim 1 wherein the particular rectangle has an associated indicator of a jurisdiction that is occupied if the location of the monitored device is located within the particular rectangle, the method further comprising loading a boundary for the jurisdiction that is occupied if the location of the monitored device lies within the particular rectangle.

15. The method of claim 1 wherein defining the boundary, determining the angle, and rotating the particular rectangle are performed by a central server.

16. The method of claim 1 wherein receiving the set of coordinate associated with the location, rotating the received set of coordinates, and comparing the rotated set of coordinates to the rotated rectangle are performed by the monitored device.

17. A method for detecting a crossing of a border between different jurisdictions, the method comprising:
    retrieving data defining at least one rectangle that represents the border between the different jurisdictions;
    receiving information relating to a current location of a monitored device; and
    comparing, by a processor, the current location with the at least one rectangle using the data defining the at least one rectangle, wherein a determination that the current location is located within the at least one rectangle indicates a border crossing by the monitored device between the different jurisdictions.

18. The method of claim 17 wherein retrieving data defining the at least one rectangle receiving information relating to the current location of the monitored device, and comparing the current location to the at least one rectangle are performed by the monitored device.

19. The method of claim 17 wherein the monitored device comprises a vehicle.

20. The method of claim 17 further comprising determining a distance covered by the monitored device within one of the jurisdictions having the border.

21. The method of claim 17 further comprising determining an amount of fuel used by the monitored device within one of the jurisdictions having the border.

22. The method of claim 17 further comprising determining statistics related to one of the jurisdictions having the border.

23. The method of claim 17 further comprising retrieving adjacent jurisdiction boundary data when the border crossing is indicated, with the adjacent jurisdiction boundary data defining one or more rectangles associated with another border of an adjacent jurisdiction that is occupied by the monitored device after the boundary crossing.

24. The method of claim 17 wherein the at least one rectangle corresponds to the border of a current jurisdiction.

25. The method of claim 24 wherein rectangles defining borders of adjacent jurisdictions do not overlap the at least one rectangle corresponding to the border of the current jurisdiction.

26. The method of claim 17 wherein the data defining the at least one rectangle includes, for each rectangle, an angle of rotation for the respective rectangle and rotated coordinates of two opposite corners of the respective rectangle, with the rotated coordinates corresponding to coordinates of the respective rectangle that have been rotated by the angle of rotation.

27. The method of claim 17 wherein comparing the current location with the at least one rectangle comprises:
  rotating a set of coordinates defining the current location by an angle of rotation associated with the at least one rectangle; and
  comparing the rotated coordinates defining the current location to rotated coordinates of two opposite corners of the at least one rectangle.

28. A method for detecting movement across a boundary, the method comprising:
  storing at least two sets of rotated coordinates associated with a predetermined rectangular boundary segment, the at least two sets of rotated coordinates corresponding to at least two sets of original coordinates that define the predetermined rectangular boundary segment in a coordinate system, wherein each of the sets of original coordinates is rotated by an angle of rotation to generate the corresponding set of rotated coordinates prior to storing each set of rotated coordinates, and the at least two sets of rotated coordinates define a rotated boundary segment having sides that are parallel to an axis of the coordinate system;
  storing the angle of rotation, wherein the angle of rotation is defined by an angle between the axis of the coordinate system and a side of the predetermined rectangular boundary segment;
  identifying a location of a monitored device;
  rotating, by the monitored device, a set of coordinates representing the identified location of the monitored device by the angle of rotation to generate a rotated set of location coordinates; and
  comparing, by the monitored device, the rotated set of location coordinates with the at least two sets of rotated coordinates to determine a position of the monitored device relative to the predetermined rectangular boundary segment.

29. The method of claim 28 wherein each set of coordinates identifies a longitudinal and a latitudinal position.

30. The method of claim 28 further comprising determining whether the boundary has been crossed based on the position of the monitored device relative to the predetermined rectangular boundary segment.

31. The method of claim 28 further comprising:
  storing rotated coordinates associated with an additional rectangular boundary segment;
  storing an angle of rotation for the additional rectangular boundary segment; and
  responsive to a determination that the location of the monitored device is not located within the predetermined rectangular boundary segment;
  rotating the set of coordinates representing the identified location of the monitored device by the angle of rotation for the additional rectangular boundary to generate a second rotated set of location coordinates; and
  comparing the second rotated set of location coordinates with the rotated coordinates associated with the additional rectangular boundary to determine whether the location of the monitored device is located within the adjacent rectangular boundary segment.

32. The method of claim 28 further comprising initiating a pre-selected response if the location of the monitored device is located within the predetermined rectangular boundary segment.

33. The method of claim 28, wherein the predetermined rectangular boundary segment represents a border between different jurisdictions.

* * * * *

UNITED STATES PATENT AND TRADEMARK OFFICE
CERTIFICATE OF CORRECTION

| | | |
|---|---|---|
| PATENT NO. | : 7,680,590 B2 | Page 1 of 1 |
| APPLICATION NO. | : 10/726278 | |
| DATED | : March 16, 2010 | |
| INVENTOR(S) | : Douglas R. Sanqunetti | |

It is certified that error appears in the above-identified patent and that said Letters Patent is hereby corrected as shown below:

In column 16, line 34, in Claim 16, delete "coordinate" and insert -- coordinates --, therefor.

In column 18, line 25, in Claim 31, delete "segment;" and insert -- segment: --, therefor.

Signed and Sealed this

Eighth Day of June, 2010

David J. Kappos
*Director of the United States Patent and Trademark Office*